United States Patent
Hatfield

(10) Patent No.: US 10,612,416 B2
(45) Date of Patent: Apr. 7, 2020

(54) OFFTAKES FOR GAS TURBINE ENGINE SECONDARY GAS FLOWS

(71) Applicant: Pratt & Whitney, East Hartford, CT (US)

(72) Inventor: Jason Hatfield, West Palm Beach, FL (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1248 days.

(21) Appl. No.: 14/846,874

(22) Filed: Sep. 7, 2015

(65) Prior Publication Data

US 2016/0069215 A1 Mar. 10, 2016

Related U.S. Application Data

(60) Provisional application No. 62/046,533, filed on Sep. 5, 2014.

(51) Int. Cl.
| | | |
|---|---|---|
| F01D 25/24 | (2006.01) | |
| F02C 9/18 | (2006.01) | |
| F01D 25/26 | (2006.01) | |
| F04D 29/52 | (2006.01) | |
| F04D 27/02 | (2006.01) | |
| F02C 6/08 | (2006.01) | |
| F02C 3/04 | (2006.01) | |

(52) U.S. Cl.
CPC ............. *F01D 25/24* (2013.01); *F01D 25/26* (2013.01); *F02C 3/04* (2013.01); *F02C 6/08* (2013.01); *F02C 9/18* (2013.01); *F04D 27/0215* (2013.01); *F04D 29/526* (2013.01)

(58) Field of Classification Search
CPC .... F01D 25/24; F04D 27/0215; F04D 29/526; F02C 3/04; F02C 6/08; F02C 9/18
USPC ........................................................ 415/220
See application file for complete search history.

(56) References Cited

U.S. PATENT DOCUMENTS

| | | | | |
|---|---|---|---|---|
| 5,351,478 | A | * | 10/1994 | Walker .................... F01D 25/26 415/144 |
| 6,325,595 | B1 | * | 12/2001 | Breeze-Stringfellow .................... F01D 17/10 415/144 |
| 6,782,702 | B2 | | 8/2004 | Charon et al. |
| 8,734,091 | B2 | | 5/2014 | Moniz et al. |

OTHER PUBLICATIONS

European Search Report for Application No. 15184141.8 dated Jan. 28, 2016.

* cited by examiner

*Primary Examiner* — Ninh H. Nguyen
*Assistant Examiner* — Jason Mikus
(74) *Attorney, Agent, or Firm* — Cantor Colburn LLP

(57) ABSTRACT

A turbo machinery case includes a shell body extending circumferentially about a longitudinal axis and defining therein a main gas path. The shell body defines a first offtake opening and a second offtake opening that extend in a circumferential direction about the longitudinal axis. The first and second offtake openings are defined at a common axial location with respect to the longitudinal axis of the turbo machinery case.

11 Claims, 3 Drawing Sheets

OFFTAKES FOR GAS TURBINE ENGINE SECONDARY GAS FLOWS

CROSS REFERENCE TO RELATED APPLICATIONS

This application claims the benefit of U.S. Provisional Patent Application Ser. No. 62/046,533, filed Sep. 5, 2014, the entire contents of which are incorporated herein by reference thereto.

BACKGROUND

The present disclosure relates to gas turbine engines, and more particularly offtakes for gas turbine engine secondary gas flows.

Gas turbine engines typically include a core flow path extending through a compressor section, a combustor section and a turbine section. Air enters the core flow path through an inlet and undergoes compression in the compressor section. The compressor section communicates the compressed air to the combustor section, which in turn mixes it with fuel, ignites the mixture to generate a flow of extremely hot, high-pressure combustion products. The combustion section communicates the combustion products to the turbine section. The turbine section extracts work from the combustion product flow for powering the compressor section and generating thrust by expanding the combustion product flow before issuing the flow to the external environment.

Some gas turbine engines include cooling systems for cooling turbine section components exposed to the high temperature, high-pressure combustion products. Such systems generally include a compressor section offtake in fluid communication with the cooled engine components through a coolant conduit. The conduit can include one or more devices arranged downstream of the offtake for subdividing the coolant flow into one or more flows for cooling different cooled engine components or supplying extracted air to other systems.

Such systems and methods are satisfactory for their intended purpose. However, there is still a need in the art for improved offtakes and offtake arrangements that allow for improved secondary airflow systems. The present disclosure provides a solution for this need.

BRIEF DESCRIPTION

A turbo machinery case includes a shell body extending circumferentially about a longitudinal axis and defining therein a main gas path. The shell body includes a first offtake opening and a second offtake opening. The first offtake opening and the second offtake opening are defined at a common axial location with respect to a longitudinal axis of the turbo machinery case. It is contemplated that both the first offtake opening and the second offtake opening can be spaced from the longitudinal axis of the turbo machinery case by a common radial distance.

In certain embodiments, the first offtake opening can extend in a circumferential direction about the longitudinal axis of the turbo machinery case. The first offtake opening can be one of a plurality of first offtake openings circumferentially disposed about the longitudinal axis of the turbo machinery case. The second offtake opening can also extend in a circumferential direction about the longitudinal axis of the turbo machinery case, and can further be one of a plurality of second offtake openings circumferentially disposed about the longitudinal axis of the turbo machinery case. The second offtake opening can be disposed between circumferentially adjacent first offtake openings, and the plurality of second offtake openings can be interspersed among the plurality of first offtake openings.

In certain embodiments the first offtake opening can be offset circumferentially from the second offtake opening. The offtake openings can be spaced from the longitudinal axis of the case by a common radial distance. The second offtake opening can be one of a plurality of second offtake openings disposed on circumferentially opposite sides of the first offtake opening. The first offtake opening can be one of a plurality of first offtake openings circumferentially interspersed amongst the second offtake openings.

In accordance with certain embodiments the shell body can define a first internal plenum in fluid communication with the main gas path through the first offtake opening. The shell body can define a second internal plenum in fluid communication with the main gas path through the second offtake opening. It is contemplated that the second internal plenum can also be arranged radially outward from the first internal plenum. The second internal plenum can be fluidly isolated from the first internal plenum for independently placing gas turbine engine components in fluid communication with the interior of the turbo machinery case.

It is also contemplated that in certain embodiments the shell body can realize the plenum structure described above with an outer shell and an inner shell disposed radially inward of the outer shell. In embodiments, an intermediate shell can be disposed between the inner shell and the outer shell such that an inner surface of the outer shell and outer surface of the intermediate shell bound the first internal plenum. The first offtake opening can extend radially outward from the main gas path to the first internal plenum. An outer surface of the inner shell and an inner surface of the intermediate shell can bound the second offtake opening, and the second offtake opening can extend radially outward and axially aft between the main gas path and the second plenum. The shell body can further include a ligament connecting the inner shell to the intermediate shell. Opposite faces of the case ligament can bound the first and second offtake openings. It is contemplated that a plurality of ligaments can bound adjacent instances of the first plurality of offtake openings and the second plurality of offtake openings.

A compressor module includes a turbo machinery case as described above with a rotor stage outer air seal seated within the shell body of the turbo machinery case. The rotor stage outer air seal is seated axially aft of the first and second offtake openings.

A gas turbine engine includes a compressor module as described above operatively associated with a turbine module. The main gas path is in fluid communication with the environment external to the engine core through the first offtake opening. The main gas path is also in fluid communication with a cooling channel defined within the turbine module through the second offtake opening.

In one non-limiting embodiment of the present disclosure, a turbo machinery case is provided, the turbo machinery case having: a shell body extending circumferentially about a longitudinal axis, the shell body defining a main gas path therethrough with a first offtake opening and a second offtake opening circumferentially spaced from the first offtake opening, the first and second offtake openings having a common axial position.

In addition to one or more of the features described above, or as an alternative to any of the foregoing embodiments, further embodiments may include a turbo machinery case, wherein the first offtake opening is offset circumferentially from the second offtake opening.

In addition to one or more of the features described above, or as an alternative to any of the foregoing embodiments, further embodiments may include a turbo machinery case, wherein the first offtake opening and the second offtake opening are both offset from the longitudinal axis by a common radial distance.

In addition to one or more of the features described above, or as an alternative to any of the foregoing embodiments, further embodiments may include a turbo machinery case, wherein the shell body defines an internal plenum in fluid communication with the main gas path through the first offtake opening.

In addition to one or more of the features described above, or as an alternative to any of the foregoing embodiments, further embodiments may include a turbo machinery case, wherein the plenum is a first internal plenum, and further comprises a second internal plenum in fluid communication with the main gas path through the second offtake opening.

In addition to one or more of the features described above, or as an alternative to any of the foregoing embodiments, further embodiments may include a turbo machinery case, wherein the first plenum is arranged radially outward of the second plenum.

In addition to one or more of the features described above, or as an alternative to any of the foregoing embodiments, further embodiments may include a turbo machinery case, wherein the shell body includes: an outer shell; an inner shell radially inward of the outer shell; and an intermediate shell disposed between the inner shell and the outer shell, wherein an inner surface of the outer shell and an outer surface of the intermediate shell bound the first internal plenum.

In addition to one or more of the features described above, or as an alternative to any of the foregoing embodiments, further embodiments may include a turbo machinery case, wherein the first offtake opening extends radially outward from the main gas path to the first internal plenum.

In addition to one or more of the features described above, or as an alternative to any of the foregoing embodiments, further embodiments may include a turbo machinery case, wherein an outer surface of the inner shell and inner surface of the intermediate shell bound the second offtake opening.

In addition to one or more of the features described above, or as an alternative to any of the foregoing embodiments, further embodiments may include a turbo machinery case, wherein the second offtake opening extends radially outward and axially aft between the main gas path and the second plenum.

In addition to one or more of the features described above, or as an alternative to any of the foregoing embodiments, further embodiments may include a turbo machinery case, wherein the shell body further includes a ligament connecting the inner shell to the intermediate shell.

In addition to one or more of the features described above, or as an alternative to any of the foregoing embodiments, further embodiments may include a turbo machinery case, wherein opposite faces of the ligament bound the first and second offtake openings.

In addition to one or more of the features described above, or as an alternative to any of the foregoing embodiments, further embodiments may include a turbo machinery case, wherein the first offtake opening is one of a plurality of first offtake openings and the second offtake opening is one of a second plurality of offtake openings, each of the first offtake openings being circumferentially interspersed between the second offtake openings.

In another non-limiting embodiment of the present disclosure, a compressor module is provided. The compressor module having: a turbo machinery case, having: a shell body extending circumferentially about a longitudinal axis, the shell body defining a main gas path therethrough with a first offtake opening and a second offtake opening defined in the shell body and spaced in a circumferential direction, and the second offtake opening at a common axial position with the first offtake opening; and a rotor stage outer air seal seated within the shell body disposed axially aft of the first and second offtake openings.

In addition to one or more of the features described above, or as an alternative to any of the foregoing embodiments, further embodiments may include a compressor module, wherein the shell body defines a first internal plenum in fluid communication with the main gas path through the first offtake opening and a second internal plenum in fluid communication with the main gas path through the second offtake opening.

In addition to one or more of the features described above, or as an alternative to any of the foregoing embodiments, further embodiments may include a compressor module, wherein the shell body includes: an outer shell; an inner shell radially inward of the outer shell; and an intermediate shell between the inner and outer shells, wherein an inner surface of the outer shell and outer surface of the intermediate shell bound the first internal plenum.

In addition to one or more of the features described above, or as an alternative to any of the foregoing embodiments, further embodiments may include a compressor module, wherein the shell body further includes a ligament connecting the inner shell to the intermediate shell.

In addition to one or more of the features described above, or as an alternative to any of the foregoing embodiments, further embodiments may include a compressor module, wherein opposite faces of the ligament bound the first and second offtake openings.

In addition to one or more of the features described above, or as an alternative to any of the foregoing embodiments, further embodiments may include a compressor module, wherein the first offtake opening is one of a plurality of first offtake openings and the second offtake opening is one of a second plurality of offtake openings, each of the first offtake openings being circumferentially interspersed between the second offtake openings.

In another non-limiting embodiment of the present disclosure, a gas turbine engine is provided, the gas turbine engine, having: a turbine module; and a compressor module operatively associated with the turbine module, the compressor module including: a shell body extending circumferentially about a longitudinal axis, the shell body defining a main gas path therethrough with a first offtake opening and a second offtake opening defined in the shell body in a circumferential direction, and the second offtake opening at a common axial position with the first offtake opening, wherein a bleed port defined in the shell body is in fluid communication with the main gas path through the first offtake opening, and wherein a cooling channel defined within the turbine module is in fluid communication with main gas path through the second offtake opening.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
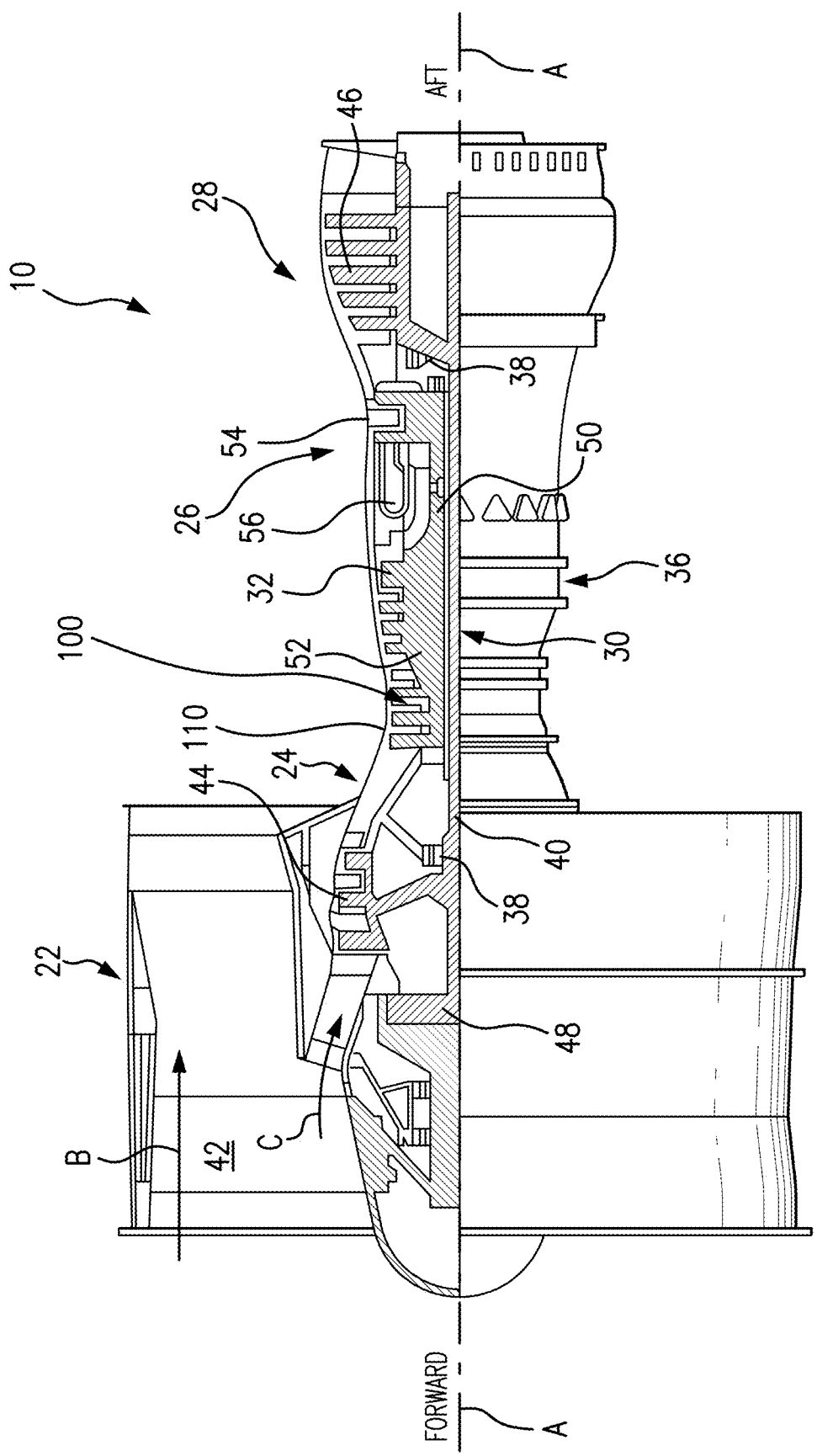
FIG. 1 is a cross-sectional side elevation schematic view of an exemplary embodiment of a gas turbine engine constructed in accordance with the present disclosure, showing a turbo machinery case.

A turbomachinery case of a gas turbine engine includes a shell body extending circumferentially about a longitudinal axis and defining therein a secondary gas volume in fluid communication with the primary gas flow of the gas turbine engine. The shell body in accordance with various embodiments of the present disclosure is modified, with respect to conventional configurations, to include a manifold structure that partitions the secondary gas volume. The manifold structure will extend circumferentially about a longitudinal axis and incorporate regularly-occurring structural features that effect two or more secondary gas flows. It is contemplated that the manifold structure so described will also be structurally joined to a conventional internal turbomachinery case that forms a radial constraint on the main gas flow, that has a critical clearance requirement with the airfoils of the attendant compressor stage, and which occurs immediately aft of the manifold structure. This conventional internal turbomachinery case will, for the remainder of this disclosure, be referred to as the ring case, as is known in the related arts.

In certain embodiments, the intent of the manifold structure so described herein will be to partition the secondary gas volume into two secondary gas flows. The structural and fluid-transmissive features of the manifold will form a first offtake opening and a second offtake opening. In one embodiment, the first offtake opening will be one of a plurality of openings circumferentially disposed about the longitudinal axis of the turbomachinery case. Likewise, the second offtake opening will be one of a plurality of openings circumferentially disposed about the longitudinal axis of the turbomachinery case. Instances of the second offtake opening can be disposed between circumferentially-adjacent instances of the first offtake opening, and the plurality of openings forming the second offtake opening is envisioned to be fully interspersed among the plurality of openings forming the first offtake opening.

It is envisioned that both openings so described herein will transmit gas flow from the primary gas flow of the engine. As is known in the related arts, the gas flow will originate from the location within the compressor that is axially aft of the stationary airfoils (stators) of the compressor stage immediately prior to the manifold axial location, and that is axially forward of the rotating airfoils (rotor blades) of the next compressor stage. Therefore, the first offtake opening and the second offtake opening are defined at a common axial location with respect to the longitudinal axis of the turbomachinery case. Further, it is contemplated that the first offtake opening and the second offtake opening will be spaced from the longitudinal axis of the turbomachinery case by a common radial distance.

In accordance with certain embodiments the shell body of the turbomachinery case can define the outer wall of a first internal plenum in fluid communication with the main gas path through the first offtake opening. It is envisioned that the remaining volume of the first internal plenum is enclosed by a secondary shell body disposed between the prior-described shell body and the ring case, and extending circumferentially about the longitudinal axis of the turbomachinery case. It is further envisioned that the secondary shell body may be an integral part of the internal manifold structure described prior. The volume between the secondary shell body and the ring case forms a second internal plenum in fluid communication with the main gas path through the second offtake opening. In this manner the second internal plenum can be fluidly isolated from the first internal plenum for independently placing gas turbine engine components in fluid communication with the main gas flow of the gas turbine engine.

Reference will now be made to the drawings wherein like reference numerals identify similar structural features or aspects of the subject disclosure. For purposes of explanation and illustration, and not limitation, a partial view of an exemplary embodiment of a turbo machinery case in accordance with the disclosure is shown in FIG. 1 and is designated generally by reference character 110. Other embodiments of the turbo machinery case in accordance with the disclosure, or aspects thereof, are provided in FIG. 2 and FIG. 3, as will be described herein. The systems and methods described herein can be used in marine, terrestrial, and aerospace gas turbine engine applications, such as aircraft main engine and auxiliary engines.

With reference to FIG. 1, gas turbine engine 10 is shown. As described herein, gas turbine engine 10 may be a two-spool turbofan engine that generally incorporates a fan section or fan module 22, a compressor section or compressor module 24 including turbo machinery case 110, a combustor section or combustor module 26 and a turbine section or turbine module 28. Of course, various embodiments of the present disclosure are contemplated for use with a single spool turbofan engine. Variant engines might optionally include an augmentor section (not shown) among other systems or features. Fan section or fan module 22 drives air along a bypass flow path B. Compressor section or compressor module 24 drives air along a main gas path C for compression and communication into combustor section or combustor module 26 and subsequent expansion through turbine section or turbine module 28. Although depicted as a two spool turbofan gas turbine engine, it is to be understood and appreciated that the concepts described herein are not limited to use with turbofans as the teachings may be applied to other types of turbine engines, such as three-spool gas turbine engine architectures.

Gas turbine engine 10 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided.

Low-speed spool 30 generally includes an inner shaft 40 that interconnects a fan 42, a low-pressure compressor 44 and a low-pressure turbine 46. Inner shaft 40 may be connected to fan 42 directly or through a geared architecture 48 to drive fan 42 at a rotation speed different than a rotation speed of low-speed spool 30. High-speed spool 32 includes an outer shaft 50 that interconnects a high-pressure compressor 52 and high-pressure turbine 54. Combustor section 26 includes a combustor 56 arranged between high-pressure compressor 52 and high-pressure turbine 54. Inner shaft 40 and outer shaft 50 are concentric and configured for rotation about longitudinal axis A. Longitudinal axis A defines a central rotation axis about which rotation components, e.g. low-speed spool 30 and high-speed spool 32, rotate and which is collinear with respective longitudinal axes of inner shaft 40 and outer shaft 50.

Low-speed spool 30 and high-speed spool 32 define a main gas path extending between forward and aft ends of gas turbine engine 10. Air traversing main gas path C is compressed by low-pressure compressor 44 and communicated to high-pressure compressor 52. High-pressure compressor 52 further compresses air traversing main gas path C and communicates core airflow C to combustor section 26. Fuel is added to air traversing main gas path C and the mixture ignited in combustor 56, the air thereby undergoing further pressurization and forming combustion products. Combustor 56 communicates the combustion products within the air traversing main gas path C into high-pressure turbine 54 and low-pressure turbine 46. High-pressure turbine 54 and low-pressure turbine 46 successively expand the combustion products with the air traversing main gas path C, extract work therefrom, and rotationally drive low-speed spool 30, high-speed spool 32, and fan 42. Rotation of fan 42 generates bypass airflow B and provides thrust. Although, an example of a gas turbine engine 10 for use with the present disclosure is described as having a low pressure compressor, a high pressure compressor and a low pressure turbine and a high pressure turbine, various embodiments of the present disclosure are contemplated for use with gas turbine engines that do not have a low pressure compressor and a low pressure turbine. In other words, various embodiments of the present disclosure are contemplated for use with gas turbine engines that have a compressor section and a turbine section which are not separated into high pressure and low pressure sections.

Gas turbine engine 10 is typically assembled in build groups or modules. In the illustrated embodiment, low-pressure compressor 44 may include three stages, while the high-pressure compressor 52 may include eight stages, and the high-pressure turbine 54 may include two stages, and low-pressure turbine 46 may include five stages, respectively, stacked in an axial arrangement. It should be appreciated, however, that gas turbine engines having any number of stages or modules will benefit from various embodiments of the present disclosure. Further, other gas turbine architectures such as three-spool architecture with an intermediate spool will also benefit from various embodiments of the present disclosure as well. Still further and as mentioned above, various embodiments of the present disclosure are contemplated for use with a single spool configuration.

Figure 2:
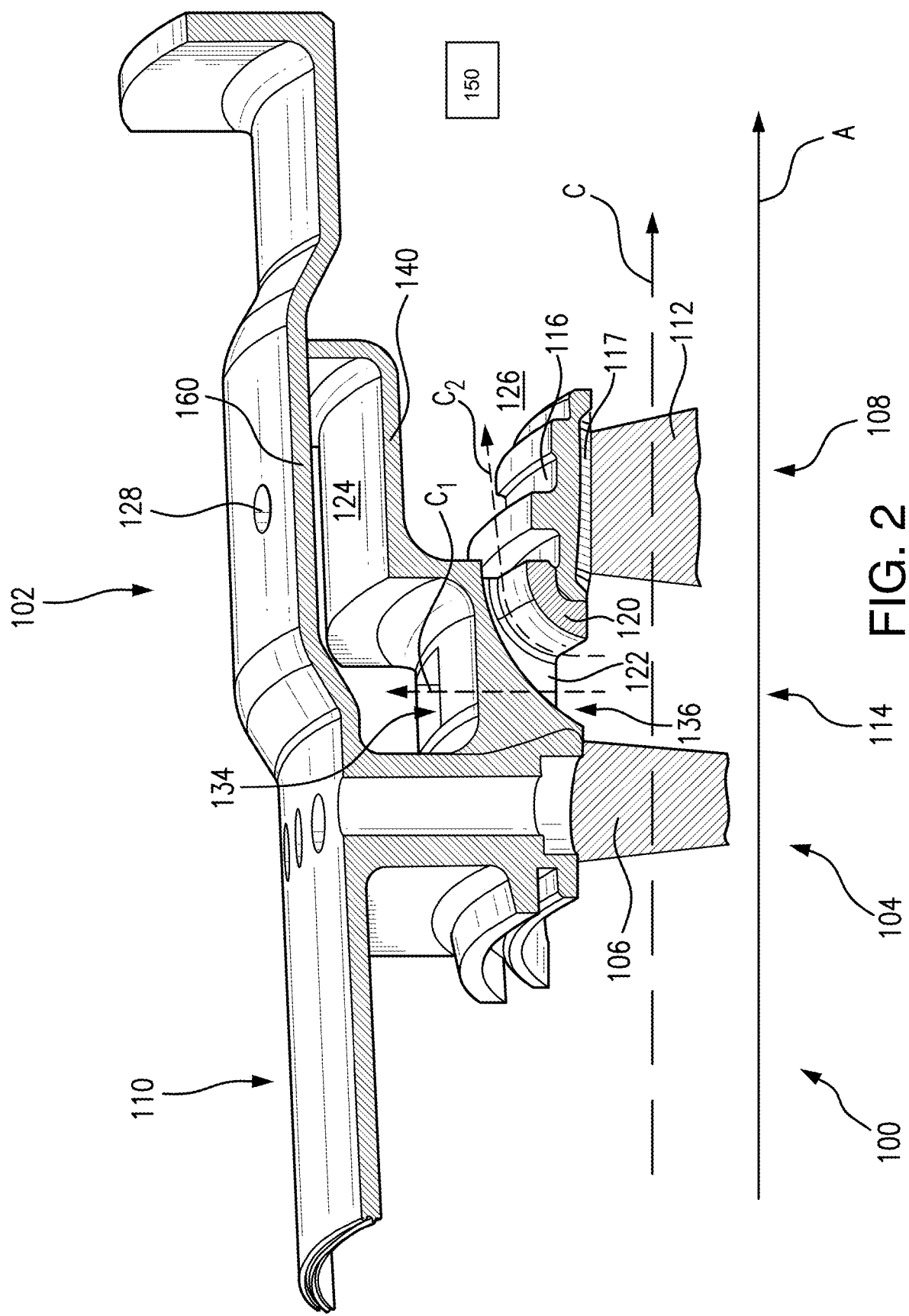
FIG. 2 is a cross-sectional perspective view of the turbo machinery case of FIG. 1, showing first and second plenums defined within the turbo machinery case.

With reference to FIG. 2, a portion of a compressor module 100 in accordance with one non-limiting embodiment of the disclosure is shown. Compressor module 100 includes a compressor stage with a shell body 102 housing turbo machinery within a turbo machinery case 110. Shell body 102 includes a stator portion 104 with stator blades 106, a rotor portion 108 with rotor blades 112 and an inner ring case 116, and an inter-stage gap 114. In one non-limiting embodiment, a rotor stage outer air seal 117 may be seated within the shell body disposed axially aft of the first and second offtake openings 134, 136. Rotor portion 108 is disposed axially aft of stator portion 104 and inter-stage gap 114 is disposed axially between stator portion 104 and rotor portion 108. Stator blades 106 and inner ring case 116 are both fixed within turbo machinery case 110 while rotor blades 112 are rotatably disposed therein. Main gas path C traverses stator portion 104, inter-stage gap 114, and rotor portion 108.

In one embodiment, the turbo machinery case 110 is configured to have an inner shell 120, an intermediate shell 140, and an outer shell 160. Inner shell 120 has an axially-truncated arcuate profile that seats inner ring case 116 on an aft recess. Inner shell 120 is connected to intermediate shell 140 by a ligament or connecting member 122 that extends radially therebetween. Intermediate shell 140 has an axially stepped profile that bounds a portion of main gas path C at its forward end and is separated from main gas path C by inner shell 120 at its aft end. Intermediate shell 140 also defines a radially-extending forward portion and radially-extending aft portion that couple outer shell 160 to intermediate shell 140. This forms an integral shell body 102 formed from inner shell 120, intermediate shell 140, outer shell 160, and ligament 122 that extends circumferentially about longitudinal axis A.

Shell body 102 defines within its interior a first internal plenum 124 and a second internal plenum 126. First internal plenum 124 is bounded by a portion of an interior-facing surface of outer shell 160, portions of an aft-facing surface and forward-facing surfaces of intermediate shell 140, and a portion of an outward-facing surface of intermediate shell 140. Second internal plenum 126 is bounded by a portion of an interior facing surface of intermediate shell 140 and an outer facing surface of inner ring case 116. First internal plenum 124 and second internal plenum 126 are substantially in fluid isolation from one another. The first internal plenum 124 is in fluid communication with engine systems external to compressor module 100 (not shown for reasons of clarity) through a bleed port 128. The second internal plenum 126 includes the volume bounded by the inner surface of outer shell 160, the top of ring case 116, as well as the tops of the inner ring cases of any subsequent stages of compressor module 100 (not shown for reasons of clarity). It is envisioned that the flow through the second internal plenum 126 will be in fluid communication with engine systems external to compressor module 100 through incorporation of a downstream port in the same manner as that used for the first internal plenum 124. Shell body 102 also defines within its interior a first offtake opening 134 and a second offtake opening 136. First offtake opening 134 is defined by intermediate shell 140 and defines a radially-extending channel $C_1$ that fluidly couples main gas path C with first internal plenum 124. Second offtake opening 136 is defined by an outer-facing surface of inner shell 120, an inner-facing surface of intermediate shell 140, and a lateral-facing (i.e. circumferential-facing) surface of ligament 122. Second offtake opening 136 defines a radially-extending, aft-directed channel $C_2$ that fluidly couples main gas path C with second internal plenum 126.

First offtake opening 134 and second offtake opening 136 are defined within shell body 102 in a circumferential direction and share a common axial position. As illustrated in FIG. 2, first offtake opening 134 is offset circumferentially from second offtake opening 136 such that a plurality of first offtake openings 134 are in fluid communication with first internal plenum 124 and a plurality of second offtake openings 136 are in fluid communication with second internal plenum 126. In this respect inter-stage gap 114 is bounded by an interrupted annulus formed by a plurality of ligaments or connecting members 122 configured and adapted for carrying axial loads through shell body 102 and separating circumferentially adjacent offtake openings. This provides a compact architecture with offtake openings leading to more than one fluid destination without the use of an air diverter or valve.

Figure 3:
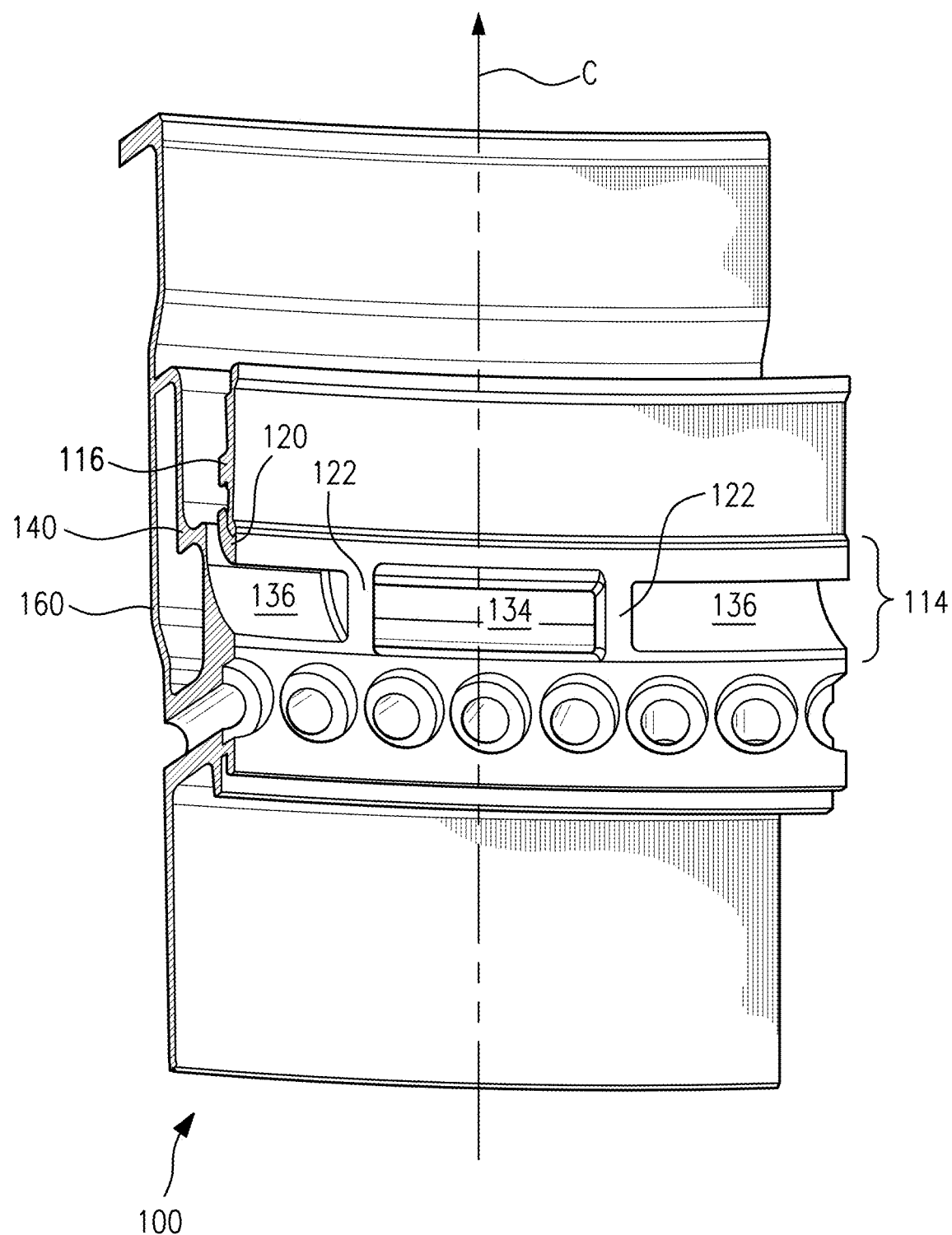
FIG. 3 is a cross-sectional perspective view of an interior of the turbo machinery case of FIG. 1, showing first and second offtake openings fluidly coupling the first and second plenums to a main gas path defined within the turbo machinery case.

With reference to FIG. 3, compressor module 100 is shown from the perspective of main gas path C looking radially outward. Inter-stage gap 114 is bounded by inner shell 120, a plurality of ligaments or connecting members 122, and a portion of intermediate shell 140 bounding main gas path C. A plurality of first offtake openings 134 and a plurality of second offtake openings 136 are circumferentially interspersed between axially-extending ligaments 122. Opposing circumferential faces of ligaments or connecting members 122 bound adjacent first offtake openings 134 and second offtake openings 136.

In various embodiments described herein, the offtake openings fluidly couple high-pressure compressor or simply compressor (in the case of a single spool engine configuration) 52 to a first plenum for purposes of providing bleed airflow and a second plenum for purposes of providing airflow to cool the outer surface of inner ring case 116 and like cases for subsequent stages of compressor module 100. Ligaments or connecting members 122 disposed between (and bounding) circumferentially adjacent offtake openings transmit axial load through the compressor shell body 102 and route airflow through first offtake openings 134 and second offtake openings 136 into separate plenums formed between shells of shell body 102. This creates a manifold-like structure that directs separate airflows to different functional plenums downstream. In the illustrated embodiment, a first plurality of offtake openings directs airflow radially into a first plenum defined between outer and intermediate shells while a second plurality of offtake openings directs airflow aft and into a second plenum defined between inner and intermediate shells. The offtake openings can be arranged in a pattern suitable for an intended application, the alternating exemplary pattern shown in FIG. 3 providing balanced flow area about the circumference of the gap between the offtake openings.

In certain embodiments, the offtake opening arrangement divides compressor airflow offtake, e.g. bleed, airflow from a single stage into two effective airflows. This can provide a first airflow directed radially outward that exits compressor module 100 through bleed port 128 for purposes of providing cooling and environmental (cabin) air, for example. A second airflow directed aft between the inner and intermediate shells of case before being extracted further aft serves to cool inner shell 120 of the compressor case forming the subsequent stages of compressor section 24. It can also provide superior specific pressure balance between the two airflows selecting the ratio of flow areas defined by the first offtake openings 134 and second offtake openings 136. In one embodiment, a cooling channel (illustrated schematically by box 150) defined within the turbine module is in fluid communication with main gas path through the second offtake opening 136.

The methods and systems of the present disclosure, as described above and shown in the drawings, provide for turbo machinery cases and/or compressor cases with superior properties including improved pressure balance between air streams originating in the compressor stage. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A turbo machinery case, comprising:
a shell body extending circumferentially about a longitudinal axis, the shell body defining a main gas path therethrough with a first offtake opening and a second offtake opening circumferentially spaced from the first offtake opening, the first and second offtake openings having a common axial position;
wherein the shell body defines a first internal plenum in fluid communication with the main gas path through the first offtake opening, and the case further comprises a second internal plenum in fluid communication with the main gas path though the second offtake opening;
wherein the shell body includes:
an outer shell;
an inner shell radially inward of the outer shell; and
an intermediate shell disposed between the inner shell and the outer shell, wherein an inner surface of the outer shell and an outer surface of the intermediate shell bound the first internal plenum, and
a ligament connecting the inner shell to the intermediate shell, wherein opposite faces of the ligament bound the first offtake opening and the second offtake opening.

2. A case as recited in claim 1, wherein the first offtake opening is offset circumferentially from the second offtake opening.

3. A case as recited in claim 1, wherein the first offtake opening and the second offtake opening are both offset from the longitudinal axis by a common radial distance.

4. A case as recited in claim 1, wherein the first plenum is arranged radially outward of the second plenum.

5. A case as recited in claim 1, wherein the first offtake opening extends radially outward from the main gas path to the first internal plenum.

6. A case as recited in claim 1, wherein an outer surface of the inner shell and inner surface of the intermediate shell bound the second offtake opening.

7. A case as recited in claim 6, wherein the second offtake opening extends radially outward and axially aft between the main gas path and the second plenum.

8. A case as recited in claim 1, wherein the first offtake opening is one of a plurality of first offtake openings and the second offtake opening is one of a second plurality of offtake openings, each of the first offtake openings being circumferentially interspersed between the second offtake openings.

9. A compressor module, comprising:
a turbo machinery case, including:
a shell body extending circumferentially about a longitudinal axis, the shell body defining a main gas path therethrough with a first offtake opening and a second offtake opening defined in the shell body and spaced in a circumferential direction, and the second offtake opening at a common axial position with the first offtake opening;
wherein the shell body defines a first internal plenum in fluid communication with the main gas path through the first offtake opening, and the case further comprises a second internal plenum in fluid communication with the main gas path though the second offtake opening;
wherein the shell body includes:
an outer shell;
an inner shell radially inward of the outer shell; and
an intermediate shell disposed between the inner shell and the outer shell, wherein an inner surface of the outer shell and an outer surface of the intermediate shell bound the first internal plenum, and
a ligament connecting the inner shell to the intermediate shell, wherein opposite faces of the ligament bound the first offtake opening and the second offtake opening; and
a rotor stage outer air seal seated within the shell body disposed axially aft of the first and second offtake openings.

10. A compressor module as recited in claim 9, wherein the first offtake opening is one of a plurality of first offtake openings and the second offtake opening is one of a second plurality of offtake openings, each of the first offtake openings being circumferentially interspersed between the second offtake openings.

11. A gas turbine engine, comprising:
a turbine module; and
a compressor module operatively associated with the turbine module, including:
a shell body extending circumferentially about a longitudinal axis, the shell body defining a main gas path therethrough with a first offtake opening and a second offtake opening defined in the shell body in a circumferential direction, and the second offtake opening at a common axial position with the first offtake opening, wherein a bleed port defined in the shell body is in fluid communication with the main gas path through the first offtake opening, and wherein a cooling channel defined within the turbine module is in fluid communication with the main gas path through the second offtake opening; and
wherein the shell body defines a first internal plenum in fluid communication with the main gas path through the first offtake opening, and the case further comprises a second internal plenum in fluid communication with the main gas path though the second offtake opening;
wherein the shell body includes:
an outer shell;
an inner shell radially inward of the outer shell; and
an intermediate shell disposed between the inner shell and the outer shell, wherein an inner surface of the outer shell and an outer surface of the intermediate shell bound the first internal plenum, and
a ligament connecting the inner shell to the intermediate shell, wherein opposite faces of the ligament bound the first offtake opening and the second offtake opening.

* * * * *